United States Patent Office 3,096,384
Patented July 2, 1963

3,096,384
PROCESS FOR PREPARING 1,2-DIENES
Ted J. Logan, Colerain Township, Hamilton County, Ohio, assignor to The Procter & Gamble Company, Cincinnati, Ohio, a corporation of Ohio
No Drawing. Filed Jan. 10, 1961, Ser. No. 81,692
21 Claims. (Cl. 260—680)

The instant invention relates to an organic synthesis, and more particularly to a process for the production of 1,2-dienes, generically known as allene compounds. Allene (propadiene) is the first member of the diolefin series and the simplest compound having double bonds in adjacent positions. Allene compounds or allenes are diolefin compounds having the general structure $>C=C=C<$.

Heretofore, various processes have been taught to prepare allene compounds. The classical synthesis of allenes involves the dehalogenation of a compound containing the grouping $C=CX-CX$ (X being halogen) by reaction with zinc dust. Allene has also been commonly prepared by reacting 1,2-dibromopropane with alcoholic potassium hydroxide; by electrolysis of itaconic acid; and, by the thermal decomposition of diketene. U.S. Patent 2,925,451 teaches the preparation of allene and methylacetylene from isobutylene or propylene by passing an olefin over a metallic filament of high resistivity heated to at least 900° C.

In U.S. Patent 2,933,544, a process is described for preparing allene compounds by increasing the carbon chain length of an olefin compound by one carbon atom. More particularly, the process comprises reacting together bromoform, potassium tertiary butylate, and an α-olefin to form a 1,1-dibromocyclopropane and thereafter reacting the 1,1-dibromocyclopropane with an active metal such as sodium, magnesium, zinc or aluminum to yield an allene product. An excess of active metal cannot be used when the reaction is conducted in the presence of a reaction medium in order to prevent rearrangement of the allene product into an acetylene. Further, it is not possible to prepare allene compounds by the process of U.S. Patent 2,933,544 from high molecular weight dibromocyclopropyl derivatives (e.g., $C_{10}$ or higher homologues) nor is it possible to realize the reaction with the dichloro derivatives. Since dichlorocyclopropyl derivatives having from 4 to 21 carbon atoms can be synthesized more economically than the corresponding dibromo compounds, it has been deemed particularly desirable to have a process for preparing allenes from dichlorocyclopropane compounds. It is also deemed desirable to have a process for preparing allene compounds from dibromocyclopropyl derivatives containing more than 10 carbon atoms.

Accordingly, it is an object of this invention to provide a process for the production of allenes from dichlorocyclopropyl derivatives.

Another object is to provide a process for the preparation of allenes from dibromocyclopropanes having 10 or more carbon atoms.

A further object is to produce allenes having up to and including 21 carbon atoms per molecule from dihalocyclopropanes containing bromine or chlorine.

A still further object is to produce allenes free from acetylenes.

And still another object is to provide a process for the production of allenes which can be safely conducted in a reaction medium in the presence of an excess of active metal.

Other and further objects and advantages of this invention will become apparent to those skilled in the art upon consideration of the accompanying disclosure.

It has now been discovered that an allene compound can be produced by reacting a dihalocyclopropyl derivative having up to and including about 21 carbon atoms per molecule with magnesium metal in a solvent or reaction media when an alkyl or aryl halide has been added thereto. As previously stated, magnesium metal alone will only react with low molecular weight dibromocyclopropanes to yield an allene product. It has now also been determined that a Grignard reagent prepared by reacting magnesium and an alkyl halide together will not convert dihalocyclopropyl derivatives to allene compounds. But surprisingly and unexpectedly, it has been found that the addition of an alkyl halide to magnesium metal in the presence of a dihalocyclopropane compound yields a diolefin having cumulated double bonds, namely, an allene of the structure $>C=C=C<$. Similarly, it has been found that an allene compound can be produced when an aryl halide rather than an alkyl halide is reacted with a dihalocyclopropane compound and magnesium metal.

The dihalocyclopropanes useful in preparing allenes according to the present invention have the following general structure

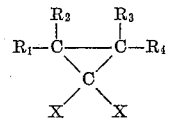

where $R_1$, $R_2$, $R_3$ and $R_4$ represent hydrogen or an alkyl radical having from 1 to 18 carbon atoms and X represents chlorine or bromine. These compounds having up to and including about 21 carbon atoms per molecule are well known compounds and may be prepared by any one of a number of known processes. For example, it now appears to be common practice to prepare 1,1-dihalocyclopropanes by reacting an α-olefin with a dihalocarbene. Dihalocarbenes add to α-olefins at the double bond to give high yields of 1,1-dihalocyclopropane compounds according to the following equation:

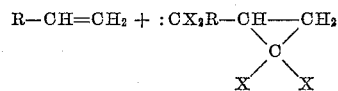

The reaction of this invention between a 1,1-dihalocyclopropane compound, magnesium metal, and alkyl or aryl halide results in the dehalogenation or elimination of both halogen atoms from the 1,1-dihalocyclopropane compound to yield an allene product containing up to and including about 21 carbon atoms per molecule in accordance with the following equation:

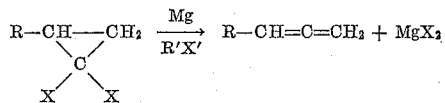

The principal product of the reaction is usually a mixture of the allene compound and a cyclopropane compound which can be subjected to conventional separation.

The alkyl or aryl halide component of the instant reaction can be a bromide, chloride, or iodide compound corresponding to the formula $R'X'$ wherein $R'$ is an alkyl or aryl radical having from 1 to 10 carbon atoms per molecule and $X'$ is a halogen which can be the same as or different from the halogen constituents X of the dihalocyclopropane compound. Low molecular weight halides such as methyl, ethyl or t-butyl halide are the preferred alkyl halides. Phenyl halide is the preferred aryl halide for use in the present process. Mixtures of alkyl halides, aryl halides, and of alkyl and aryl halides perform satisfactorily with substantially the same results as nonmixtures of halide compounds.

The magnesium metal can be in any physical form. Successful practice of the present invention has been achieved by using magnesium metal chunks, shavings, granules, powder and mixtures thereof. An excess of magnesium does not adversely affect the recovery of the allene product since no conversion of allene to acetylene occurs in the present process. The form of the magnesium metal employed is governed by convenience and type of process. For instance, in a batch process it may be most convenient to use shavings of magnesium whereas in continuous processing magnesium chunks may be desirable.

As has been indicated, the process of the present invention is conducted in the presence of a reaction media or solvent. Any solvent can be used which is satisfactory as a Grignard solvent. In practicing the present invention, it is preferred to use an ether solvent such as anhydrous diethyl ether, tetrahydrofuran, dimethyl ether of diethylene glycol ("Diglyme"), dipropyl ether or dibutyl ether, and to dissolve the 1,1-dihalocyclopropane compound in the solvent after the addition of magnesium thereto and thereafter add the alkyl or aryl halide. However, the order of addition of the reactants other than the solvent is immaterial as the solvent is necessary to initiate the reaction. It is only essential that addition of reactants be such that the alkyl halide and magnesium metal do not initially react with each other to form a Grignard reagent, namely, an alkylmagnesium halide which will not then react with the dihalocyclopropane compound to yield an allene product. In greater detail, it has been found both practical and satisfactory to follow a procedure consistent with the practice illustrated hereinafter in Example I.

Excess amounts of magnesium metal and alkyl or aryl halide can be used in carrying out the instant reaction since there is no danger of the allene product rearranging into an acetylene. The pressure, which will usually be in the range of from atmospheric up to 1000 p.s.i.g. or more, preferably atmospheric, and temperature, in the range from about zero to 165° C., can be varied over a broad range which is limited only by the freezing and boiling points of the solvent employed. In other words, the pressure and temperature are such that reaction may be initiated and the solvent kept in the liquid phase. Further, these conditions are such to keep the reaction in proper reflux for the length of time required for completion of the reaction which may vary from 1 to 4 hours.

In the process of the present invention, the allene compound and cyclopropane mixture can be isolated by conventional separation procedures such as hydrolysis and fractional distillation. If desired, unreacted starting material can be recycled to further increase the yield of the allene product.

As will be evident to a person skilled in the art, the process of this invention can be practiced as a batch process or carried out continuously by maintaining a suitable concentration of reactants in a reactor for a sufficient residence time as required to complete the reaction. The residence time in continuous processing can vary widely since it is dependent upon the temperature and pressure at which the process is carried out, the amount of reactants added and the method of reactant addition. The residence time for the conversion of a dihalocyclopropane compound to an allene compound, within the preferred temperature range of about zero to about 165° C., comes within the range of one second to 4 hours or more when the reaction is carried out at atmospheric pressure depending upon the specific dihalocyclopropane compound reacted, a longer reaction time generally being required for dihalocyclopropanes of increasing molecular weight. As previously indicated, an excess amount of magnesium metal, preferably in a molar ratio greater than 12:1 for each mole of dihalocyclopropane, and an excess amount of alkyl or aryl halide can be used. It is advantageous, however, to use molar proportions of alkyl or aryl halide to dihalocyclopropane compound falling within the range of 0.05 to 50, preferably 2.0 to 25.0, moles of alkyl or aryl halide per mole of dihalocyclopropane compound. When a continuous flow system is employed, it is preferred to dissolve the dihalocyclopropane in solvent prior to the introduction of the dihalocyclopropane into the reaction chamber containing the magnesium. The alkyl or aryl halide may be added to the dihalocyclopropane compound at any time after it has been combined with solvent, preferably after the dihalocyclopropane compound and solvent have been introduced into the reactor.

The allene compounds produced by this invention have long been of interest as organic intermediates. The optical properties of allenes and their use in the preparation of polymers, ketones and acetylenic compounds give them considerable practical importance.

A more comprehensive understanding of the present invention will be obtained by referring to the following examples which are not intended to be unduly limitative but solely illustrative of the generally broad scope of the present invention.

EXAMPLE I

A. 1,1-dichloro-2-decylcyclopropane, 6.3 g., 0.025 mole, prepared by the reaction of potassium t-butoxide with $CHCl_3$ and 1-dodecene, was dissolved in 200 ml. of anhydrous diethyl ether containing 12.15 g. of Mg shavings in a 500 ml., 3-necked flask equipped with reflux condenser, dropping funnel, stirrer, and inlet-outlet connections for a nitrogen atmosphere. Ethyl bromide (EtBr), 54.5 g., 0.5 mole, was added dropwise to this solution which was at room temperature (20° C.) with stirring. After the addition of a few drops of EtBr, a vigorous reaction began and EtBr was added at a rate sufficient to maintain reflux (approx. 1 hr.) when the temperature was adjusted to and maintained at 34° C. The solution was stirred an additional hour before hydrolysis with 50 ml. of water, then 100 ml. of 10% HCl. The layers were separated, the top organic layer dried with $MgSO_4$, filtered, then distilled to give 2.6 g. of distillate, B.P. 68–94° C. (0.85 mm.), and 1.2 g. of liquid, high boiling residue. The distillate was analyzed by gas chromatography and shown to consist of 44% 1,2-tridecadiene or decyl allene, 33% decyl cyclopropane, 5% starting material (1,1-dichloro-2-decylcyclopropane) and 18% of unidentified minor components containing no acetylenic products. The decyl allene and decylcyclopropane were obtained in pure form by preparative chromatography and identified in the following manner. Decyl allene was hydrated to 2-tridecanone which was converted to the 2,4-dinitrophenylhydrazone derivative (M.P. 71.8–72.0° C.), and shown to be identical to the same derivative of a known sample of 2-tridecanone. The allene showed a strong peak in its infrared spectrum at 5.09 microns.

The decylcyclopropane was identified by establishing its infrared and gas chromatographic identity with an authentic sample prepared by the Na—MeOH reduction of 1,1-dibromo-2-decylcyclopropane. Both samples were saturated to bromine.

B. Similar results can be obtained by the substitution of tetrahydrofuran, dimethyl ether of diethylene glycol ("Diglyme"), dipropyl ether, or dibutyl ether for the anhydrous diethyl ether solvent. Refluxing is conducted at the boiling point temperature of the solvent employed, e.g., tetrahydrofuran, 66° C.; dipropyl ether, 90° C.; debutyl ether, 142° C.; and, dimethyl ether of diethylene glycol, 161° C.

C. An alternative separation route can be realized if the solution, before hydrolysis, is extracted several times with petroleum ether. This extract contains decyl allene with only a trace quantity of decylcyclopropane. The petroleum ether insoluble portion may then be hydrolyzed to give essentially allene-free decylcyclopropane.

EXAMPLE II

The reaction of Example I was repeated except that the EtBr was replaced by t-butyl chloride, 46.3 g., 0.5 mole. Hydrolysis of the product and recovery in the manner as set forth in Example I gave 2.61 g. of distilled product consisting of 40% decyl allene, 51% decylcyclopropane and 9% of unidentified minor components. Also recovered by distillation was 1.6 g. of starting material (1,1-dichloro-2-decylcyclopropane) and a residue weighing 0.48 g.

EXAMPLE III

The reaction of Example I was repeated except that the EtBr was replaced by bromo benzene, 78.5 g., 0.5 mole. Hydrolysis of the product and recovery in a manner as set forth in Example I, gave 2.43 g. of distilled product consisting of 44% decyl allene, 30% decylcyclopropane and 23% of unidentified minor components. A residue weighing 0.5 g. but containing no starting material was recovered by distillation.

EXAMPLE IV

The reaction of Example I was repeated except that the EtBr was replaced by 71.0 g., 0.5 mole, of methyl iodide (MeI). Hydrolysis of the product and recovery in the manner set forth in Example I gave 3.14 g. of distillate consisting of 55% decyl allene, 23% of decylcyclopropane and 22% of unidentified minor components. 2.14 g. of residue and starting material (1,1-dichloro-2-decylcyclopropane) were also recovered by distillation.

EXAMPLE V

The reaction of Example I was repeated except that the EtBr was replaced by 78.0 g., 0.5 mole, of ethyl iodide (EtI). Hydrolysis of the product and recovery in the manner set forth in Example I gave 2.93 g. of distillate consisting of 68% decyl allene, 20% decylcyclopropane and 12% of unidentified minor components and 1.78 g. of residue and starting material (1,1-dichloro-2-decylcyclopropane).

EXAMPLE VI

The reaction of Example I was repeated except that the EtBr was replaced by p-bromoanisole, 93.5 g., 0.5 mole. Hydrolysis of the product and recovery in the manner set forth in Example I gave 2.07 g. of distillate consisting of 44% decyl allene, 29% decylcyclopropane, 27% of unidentified minor components and 5.5 g. of solid residue.

EXAMPLE VII

In this example a normally gaseous alkyl halide was employed. 1,1-dichloro-2-decylcyclopropane, 6.3 g., 0.025 mole, was dissolved in 200 ml. of anhydrous diethyl ether and mixed with 12.15 g., 0.5 mole, of Mg shavings. Ethyl chloride (EtCl), 32.3 g., 36 ml., 0.5 mole, was condensed and placed in a Dry Ice jacketed separatory funnel maintained at 0° C. inserted in a 3-necked, 500 ml. flask equipped with Dry Ice condenser and mechanical stirrer. After a few ml. of EtCl had been added, several drops of MeI were added to initiate the reaction and the remainder of the EtCl added rapidly. The heat of the ensuing reaction refluxed the EtCl and its low B.P. served to control the reaction which was conducted at 12° C. After approximately 20 minutes, the temperature was adjusted to and maintained at 34° C. for approximately 1 hour while refluxing was continued. The solution was then treated as described in Example I, distillation yielding 3.14 g. of distillate consisting of 42% decyl allene, 26% decylcyclopropane, 32% of unidentified minor components and 1.5 g. of residue.

EXAMPLE VIII 1,1-dibromo-2-decylcyclopropane, 8.5 g., 0.025 mole, prepared by the reaction of potassium t-butoxide with bromoform and 1-dodecene, was reacted with 12.15 g. 0.5 mole, of Mg shavings and 54.5 g., 0.5 mole, of EtBr in the manner set forth in Example I. Recovery of the product as before gave 2.0 g. of distillate consisting of 47% decylcyclopropane, 45% decyl allene, 8% of unidentified minor components and 1.4 g. of residue.

EXAMPLE IX 1,1-dichloro-2-hexylcyclopropane, 9.75 g., 0.05 mole, prepared by the reaction of potassium t-butoxide with CHCl$_3$ and 1-octene, was reacted with 12.15 g., 0.5 mole, of Mg shavings and 54.5 g., 0.5 mole, of EtBr in the manner set forth in Example I. Hydrolysis and distillation gave 2.2 g. of distilled product, B.P. 60–63° C. (20–21 mm.), and 2.31 g. of residue. Analysis showed that the distillate consisted of 37% 1,2-nonadiene or hexyl allene, 23% hexylcyclopropane and 40% of unidentified minor components.

EXAMPLE X

A. 1,1-dichloro-2-hexadecylcyclopropane, 8.38 g., 0.025 mole, prepared by the reaction of potassium t-butylate with CHCl$_3$ and 1-octadecene, was reacted with 12.15 g., 0.5 mole, of Mg shavings and 54.5 g., 0.5 mole, of EtBr in the manner set forth in Example I. Hydrolysis and distillation gave 4.5 g. of distillate, B.P. 109°–112° C. (0.07 mm.), and 2.0 g. of residue. Analysis showed that the distillate consisted of 43.5% 1,2-nonadecadiene or hexadecyl allene, 33.2% of hexadecylcyclopropane, and 23.3% of unidentified minor components.

B. Similar results can be obtained by the substitution in the example of 1,1-dibromo-2-hexadecylcyclopropane for 1,1-dichloro-2-hexadecylcyclopropane.

EXAMPLE XI

The reaction of Example I was repeated in a series of experiments in which the molar ratio of 1,1-dichloro-2-decylcyclopropane (I):Mg:EtBr was varied. The results of these experiments are given below in Table I.

Table I

| (I)/Mg/EtBr | Percent Decyl allene | Percent Decylcyclopropane | Percent (I) Recovered |
|---|---|---|---|
| 1/20/20 | 43.7 | 30.5 | 5.1 |
| 1/15/15 | 43.2 | 22.5 | 18.4 |
| 1/10/10 | 28.7 | 19.0 | 48.2 |
| 1/5/5 | 11.8 | 8.4 | 79.0 |
| 1/2/2 | 4.3 | 2.9 | 92.0 |

It will be apparent to those skilled in the art that variations and modifications of the present invention can be made upon study of the foregoing disclosure. Such variations and modifications are intended to be within the spirit and scope of this invention as defined in the appended claims.

What is claimed is:

1. The process for the preparation of allene compound comprising reacting in an ether solvent
   (1) a 1,1-dihalocyclopropane selected from the group consisting of 1,1-dichlorocyclopropane having the general formula:

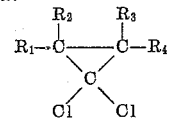

wherein R$_1$, R$_2$, R$_3$, and R$_4$ are each radicals selected from the group consisting of hydrogen and an alkyl radical having from 1 to 18 carbon atoms such that the 1,1-dichlorocyclopropane compound has up to and including 21 carbon atoms per molecule; and, 1,1-dibromocyclopropane having the general formula:

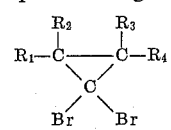

wherein R$_1$, R$_2$, R$_3$ and R$_4$ are as above such that the the 1,1-dibromocyclopropane has from 10 carbon atoms per molecule up to and including 21 carbon atoms per molecule with (2) magnesium and
(3) a halide compound having the general formula R'X' wherein R' is a radical selected from the group consisting of alkyl and aryl radicals having from 1 to 10 carbon atoms and X' is a halogen selected from the group consisting of bromine, chlorine, and iodine.

2. The process for the preparation of an allene compound containing up to and including 21 carbon atoms per molecule comprising reacting in an ether solvent a 1,1-dichlorocyclopropane having the general formula

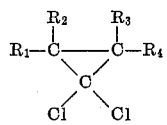

wherein $R_1$, $R_2$, $R_3$ and $R_4$, each are radicals selected from the group consisting of hydrogen and an alkyl radical having from 1 to 18 carbon atoms with magnesium and a halide compound having the general formula R'X' wherein R' is a radical selected from the group consisting of alkyl and aryl radicals having from 1 to 10 carbon atoms and X' is a halogen selected from the group consisting of bromine, chlorine, and iodine.

3. The process for the preparation of 1,2-tridecadiene (decylallene) comprising reacting in an ether solvent 1,1-dichloro-2-decylcyclopropane with magnesium and a halide compound having the general formula R'X' wherein R' is a radical selected from the group consisting of alkyl and aryl radicals having from 1 to 10 carbon atoms and X' is a halogen selected from the group consisting of bromine, chlorine and iodine.

4. The process as set forth in claim 3 wherein the halide is ethyl bromide.

5. The process as set forth in claim 3 wherein the halide is t-butyl chloride.

6. The process as set forth in claim 3 wherein the halide is methyl iodide.

7. The process as set forth in claim 3 wherein the halide is ethyl iodide.

8. The process as set forth in claim 3 wherein the halide is a mixture of ethyl chloride and methyl iodide.

9. The process as set forth in claim 3 wherein the halide is bromo benzene.

10. The process as set forth in claim 3 wherein the halide is p-bromoanisole.

11. The process as set forth in claim 3 wherein the ether solvent is anhydrous diethyl ether.

12. The process for the preparation of 1,2-nonadiene (hexyl allene) comprising reacting in an ether solvent 1,1-dichloro-2-hexylcyclopropane with magnesium and a halide compound having the general formula R'X' wherein R' is a radical selected from the group consisting of alkyl and aryl radicals having from 1 to 10 carbon atoms and X' is a halogen selected from the group consisting of bromine, chlorine and iodine.

13. The process as set forth in claim 12 wherein the halide is ethyl bromide.

14. The process as set forth in claim 12 wherein the ether solvent is anhydrous diethyl ether.

15. The process for the preparation of 1,2-nonadecadiene (hexadecyl allene) comprising reacting in an ether solvent 1,1-dichloro-2-hexadecylcyclopropane with magnesium and a halide compound having the general formula R'X' wherein R' is a radical selected from the group consisting of alkyl and aryl radicals having from 1 to 10 carbon atoms and X' is a halogen selected from the group consisting of bromine, chlorine and iodine.

16. The process as set forth in claim 15 wherein the halide is ethyl bromide.

17. The process as set forth in claim 15 wherein the ether solvent is anhydrous diethyl ether.

18. The process for the preparation of an allene compound having from 10 carbon atoms per molecule up to and including 21 carbon atoms per molecule comprising reacting in an ether solvent a 1,1-dibromocyclopropane having the general formula

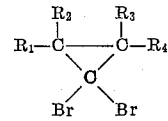

wherein $R_1$, $R_2$, $R_3$ and $R_4$ each are radicals selected from the group consisting of hydrogen and an alkyl radical having from 1 to 18 carbon atoms such that the 1,1-dibromocyclopropane has from 10 carbon atoms per molecule up to and including 21 carbon atoms per molecule with magnesium and a halide compound having the general formula R'X' wherein R' is a radical selected from the group consisting of alkyl and aryl radicals having from 1 to 10 carbon atoms and X' is a halogen selected from the group consisting of bromine, chlorine, and iodine.

19. The process for the preparation of 1,2-tridecadiene (decylallene) comprising reacting in an ether solvent 1,1-dibromo-2-decylcyclopropane with magnesium and a halide compound having the general formula R'X' wherein R' is a radical selected from the group consisting of alkyl and aryl radicals having from 1 to 10 carbon atoms and X' is a halogen selected from the group consisting of bromine, chlorine and iodine.

20. The process as set forth in claim 19 wherein the halide is ethyl bromide.

21. The process set forth in claim 19 wherein the ether solvent is anhydrous diethyl ether.

References Cited in the file of this patent
UNITED STATES PATENTS

| | | |
|---|---|---|
| 2,056,822 | Britton et al. | Oct. 6, 1936 |
| 2,881,225 | Kaiser et al. | Apr. 7, 1959 |
| 2,933,544 | Doering et al. | Apr. 19, 1960 |